(12) United States Patent　　　(10) Patent No.:　US 12,673,447 B2
　　　Galt et al.　　　　　　　　　　　(45) Date of Patent:　　　Jul. 7, 2026

(54) MOLDED ARTICLE, CONTAINER AND A METHOD FOR THE MOLDING AND RECYCLING THEREOF

(71) Applicant: HUSKY INJECTION MOLDING SYSTEMS LTD., Bolton (CA)

(72) Inventors: John Robert Galt, Bolton (CA); Joachim Johannes Niewels, Thornton (CA); Georgio Kfoury, Heisdorf (LU); Jean-Christophe Witz, Yutz (FR); Sebastien Sang Nguyen-Hoang, Luxembourg (LU)

(73) Assignee: Husky Injection Molding Systems Ltd., Bolton (CA)

( * ) Notice: Subject to any disclaimer, the term of this patent is extended or adjusted under 35 U.S.C. 154(b) by 945 days.

(21) Appl. No.: 16/343,135

(22) PCT Filed: Oct. 4, 2017

(86) PCT No.: PCT/CA2017/051181
§ 371 (c)(1),
(2) Date: Apr. 18, 2019

(87) PCT Pub. No.: WO2018/090128
PCT Pub. Date: May 24, 2018

(65) Prior Publication Data
US 2019/0315018 A1　　Oct. 17, 2019

Related U.S. Application Data

(60) Provisional application No. 62/436,029, filed on Dec. 19, 2016, provisional application No. 62/423,842, filed on Nov. 18, 2016.

(51) Int. Cl.
B29B 11/14　　　(2006.01)
B29B 11/08　　　(2006.01)
(Continued)

(52) U.S. Cl.
CPC ............. B29B 11/14 (2013.01); B29B 11/08 (2013.01); B29B 17/02 (2013.01);
(Continued)

(58) Field of Classification Search
CPC .... B65D 1/0215; B65D 1/0207; B65D 79/02; B32B 1/02; B29B 11/08; B29B 11/10;
(Continued)

(56) References Cited

U.S. PATENT DOCUMENTS 5,181,394 A　　1/1993　Schea, III et al.
6,217,819 B1 *　4/2001　Wunderlich ............ B29C 49/42
　　　　　　　　　　　　　　　　　　　　264/513
(Continued)

FOREIGN PATENT DOCUMENTS

CN　　　104332388 A　　2/2015
EP　　　2728328 A1　　5/2014
(Continued)

OTHER PUBLICATIONS

Maria Laura Passos, Claudio P. Ribeiro,Innovation in Food Engineering—New Techniques and Product,p. 392, Jan. 31, 2013.
(Continued)

*Primary Examiner* — James C Yager
(74) *Attorney, Agent, or Firm* — Wolf, Greenfield & Sacks, P.C.

(57)　　　　　ABSTRACT

Disclosed herein, amongst other things, is a molded article, such as a preform that is blow moldable to form a container, and a related method of forming and recycling a container. The structure and steps includes injection molding a molded article having tubular body.

46 Claims, 8 Drawing Sheets

(51) Int. Cl.

| | |
|---|---|
| *B29B 17/02* | (2006.01) |
| *B29B 17/04* | (2006.01) |
| *B29C 45/16* | (2006.01) |
| *B29C 49/00* | (2006.01) |
| *B29C 49/06* | (2006.01) |
| *B29C 49/78* | (2006.01) |
| *B65D 1/02* | (2006.01) |
| *B29K 67/00* | (2006.01) |
| *B29L 31/00* | (2006.01) |

(52) U.S. Cl.
CPC ...... *B29B 17/0412* (2013.01); *B29C 45/1684* (2013.01); *B29C 49/0005* (2013.01); *B29C 49/06* (2013.01); *B29C 49/78* (2013.01); *B65D 1/0215* (2013.01); *B29B 2017/0203* (2013.01); *B29B 2017/0293* (2013.01); *B29C 2049/78805* (2022.05); *B29C 2949/0724* (2022.05); *B29C 2949/073* (2022.05); *B29C 2949/0763* (2022.05); *B29C 2949/0771* (2022.05); *B29K 2067/043* (2013.01); *B29K 2067/046* (2013.01); *B29K 2995/0062* (2013.01); *B29L 2031/716* (2013.01)

(58) Field of Classification Search
CPC ..... B29B 11/14; B29B 17/02; B29B 17/0412; B29B 2911/14; B29B 2911/14331; B29B 2911/14333; B29B 2911/14373; B29B 2911/14426; B29B 2017/0203; B29B 2017/0293; B29C 45/1684; B29C 49/06; B29C 49/0005; B29C 2049/78805; B29C 2949/0724; B29C 2949/073; B29C 2949/0763; B29C 2949/0771; B29C 2049/023; B29C 49/071; B29C 49/22; B29C 49/0685; B29C 2949/0715; B29C 2949/0721; B29C 2949/0732; B29C 2949/0746; B29C 2949/3016; B29C 2949/3018; B29C 2949/0745; B29C 2949/0762; B29C 2949/3032; B29C 45/00; B29K 2067/043; B29K 2067/046; B29K 2995/0062; B29K 2031/04; B29L 2031/716; B29L 2009/00; B29L 2031/7158; B29L 2031/7172
See application file for complete search history.

(56) References Cited

U.S. PATENT DOCUMENTS

| | | | | |
|---|---|---|---|---|
| 6,270,868 | B1 * | 8/2001 | Matsui .............. | B65D 23/0885 |
| | | | | 220/62.12 |
| 6,548,133 | B2 | 4/2003 | Schmidt et al. | |
| 6,730,259 | B1 * | 5/2004 | Ikeda .................... | B29C 49/061 |
| | | | | 264/534 |
| 6,859,745 | B2 | 2/2005 | Carr et al. | |
| 7,645,135 | B2 | 1/2010 | Hutchinson et al. | |
| 7,713,464 | B2 | 5/2010 | Nakajima et al. | |
| 7,799,837 | B2 | 9/2010 | Yamane et al. | |
| 7,891,513 | B2 | 2/2011 | Mody et al. | |
| 7,976,919 | B2 | 7/2011 | Sato et al. | |
| 8,171,705 | B2 | 5/2012 | Mitadera et al. | |
| 8,524,340 | B2 * | 9/2013 | Hashimoto .......... | B65D 1/0215 |
| | | | | 264/513 |
| 8,551,589 | B2 | 10/2013 | Hutchinson et al. | |
| 2002/0149003 | A1 | 10/2002 | Lutch et al. | |
| 2005/0011892 | A1 | 1/2005 | Nakajima et al. | |
| 2005/0170113 | A1 * | 8/2005 | Hill ..................... | B29C 49/0073 |
| | | | | 264/537 |
| 2005/0223827 | A1 | 10/2005 | Walker | |
| 2005/0236415 | A1 | 10/2005 | Ozasa et al. | |
| 2006/0108405 | A1 | 5/2006 | Sanchez et al. | |
| 2007/0089573 | A1 * | 4/2007 | Williams ............... | B26D 3/166 |
| | | | | 82/47 |
| 2007/0218304 | A1 | 9/2007 | Bourgeois et al. | |
| 2007/0251912 | A1 | 11/2007 | Sixou et al. | |
| 2008/0184927 | A1 | 8/2008 | Pham et al. | |
| 2008/0230541 | A1 | 9/2008 | Bayss et al. | |
| 2010/0180979 | A1 * | 7/2010 | Mitadera ............... | B29C 49/221 |
| | | | | 141/1 |
| 2012/0029228 | A1 * | 2/2012 | Coszach .................. | C08J 11/16 |
| | | | | 560/179 |
| 2014/0004071 | A1 | 1/2014 | Brown | |
| 2014/0069202 | A1 | 3/2014 | Fisk | |
| 2014/0138274 | A1 | 5/2014 | Smith et al. | |
| 2015/0021296 | A1 | 1/2015 | Pilch et al. | |
| 2015/0174803 | A1 | 6/2015 | Newman et al. | |
| 2015/0321496 | A1 | 11/2015 | Clayton et al. | |

FOREIGN PATENT DOCUMENTS

| | | |
|---|---|---|
| GB | 1397570 A | 6/1975 |
| WO | 9308095 A1 | 4/1993 |
| WO | 2011115815 A1 | 9/2011 |

OTHER PUBLICATIONS

Yinghong Qu, Plastic Manual, Weapon Industry Press Feb. 28, 1991.
Albright, General Plastics and Production of Monomers; Chemical Industry Press Oct. 31, 1981.
PCT International Search Report, Zhu Julia, Jan. 9, 2018, 4 pages.

\* cited by examiner

START molding (410) a molded article (150, 650, 750, 850, 950, 1050) having a body that is configurable to define a storage vessel of the container (190, 290, 390, 690); wherein the body is formed from a first thermoplastic (182) that is stable in contact with water and from a second thermoplastic (184) that is unstable in contact with water; wherein the second thermoplastic (184) carries an additive (186) therein.

END

400

START molding (510) a molded article (150, 650, 750, 850, 950, 1050) having a body that is configurable to define a storage vessel of the container (190, 290, 390, 690);

incorporating (520) a visual indicator (199, 299, 399, 699) anywhere on the container that is configured to provide a visual indication responsive to a change in a characteristic of the container (190, 290, 390, 690)

END

500

MOLDED ARTICLE, CONTAINER AND A METHOD FOR THE MOLDING AND RECYCLING THEREOF

TECHNICAL FIELD

The present disclosure broadly relates to molded articles and containers formed by molding systems, and to method(s) for the molding and recycling thereof.

BACKGROUND

Molding is a process by virtue of which a molded article can be formed from molding material by using a molding system. Various molded articles can be formed by using the molding process, such as an injection molding process. One example of a molded article that can be so formed includes a preform that is blow moldable into a container, such as, a bottle, can or the like. Such preforms are typically molded from a thermoplastic such as polyethylene terephthalate (PET) and are otherwise moldable from other thermoplastics such as, for example, high-density polyethylene (HDPE), or polypropylene (PP). Moreover, it is known to mold preforms having a multilayer structure for imparting desired properties to the container blow molded therefrom. As an example, it is known to provide a preform having a three layer construction wherein the inner and outer layers are formed of a common thermoplastic such as PET and the intermediate, or core layer, is formed from some other thermoplastic such as, for example, nylon, PolyGlycolide Acid (PGA), and Ethylene Vinyl Alcohol (EVOH), amongst many others. The foregoing construction provides advantages such as improved barrier resistance to the migration of gas and moisture through the thin wall of the container. In another example, the molded article may be a finished molded article, such as, for example, a cup, can, container or bottle without any subsequent operations for the remolding thereof.

For improved aesthetics and for marketing reasons such molded articles may be colored. It is known to add colorants into feeds of thermoplastic material. When molding preforms having a multilayer structure the colorant is added to the thermoplastic that provides the inner and/or outer skin layers. For sake of a long shelf life and product safety the thermoplastic, such as PET, that is used to form the inner and outer skin layers is selected be quite stable in contact with water it does not readily dissolve or otherwise hydrolyze. The foregoing comes at a cost in terms of the recyclability. Specifically, there are costs and challenges associated with the steps of separating the different thermoplastic layers, through mechanical, physical means or chemical means, and then segregating the different types and colors of thermoplastics.

Furthermore, or in the alternative, removing the colorant from the water stable thermoplastic is also prohibitively expensive in that it requires a rather intensive effort to selectively depolymerize or dissolve the plastic using an appropriate solvent, washing of the reagents to remove the colorants and then re-polymerizing or eliminating the solvent.

The barrier properties of the core layer in a container vary with the thermoplastic selected. To improve recyclability of the container it is desirable to select a thermoplastic such as PGA or PLA that readily hydrolyze. The foregoing does come at a cost in terms of a limited shelf life of the product kept in the container as such relatively hydrolysable thermoplastics are relatively prone to degrade (i.e. relative to water stable thermoplastics such as PET). Unfortunately, there is no readily discernable indication of the barrier layer having degraded to a point that the product may have deteriorated.

SUMMARY

In accordance with an aspect disclosed herein, there is provided a molded article for providing a container. The molded article may include, amongst other things, a body configurable to define a storage vessel of the container. The body is formed, in part, from a first thermoplastic that is stable in contact with water and from a second thermoplastic that is unstable in contact with water (i.e. soluble and/or degradable). The second thermoplastic carries an additive therein, such as, for example, a colorant or a visual indicator. A technical effect of the foregoing may be derived with recycling of the container wherein the additive and the second thermoplastic are easily separated from the first thermoplastic with a grinding of the container into pieces and then processing them in a water solution to induce selective dissolution or degradation of the second thermoplastic.

The molded article may be a finished container or a precursor article, such as a preform, that is re-moldable (e.g. blow molding, liquid molding) to form the container.

In accordance with another aspect disclosed herein, there is provided a container such as one formed from the molded article above. The container includes a body that is configured to define a storage vessel. The body is formed, in part, from a first thermoplastic that is stable in contact with water and from a second thermoplastic that is unstable in contact with water. The second thermoplastic carries an additive therein, such as, for example, a colorant or a visual indicator. A technical effect of the foregoing may be derived with recycling of the container wherein the additive and the second thermoplastic are rendered separable from the first thermoplastic with a grinding of the container into pieces and then processing them in a water solution to induce selective dissolution or degradation of the second thermoplastic.

For improved recyclability, the first thermoplastic may be devoid of the additive, most particularly a colorant.

The molded article and/or container may include, for example, a multilayer structure wherein the second thermoplastic is provided in a carrier layer that is encapsulated by an outer skin layer and an inner skin layer that are formed from the first thermoplastic.

Without specific limitation, the first thermoplastic may be provided by one or more of polyethylene terephthalate, high-density polyethylene, or polypropylene. Likewise, the second thermoplastic may be provided by one or more of a water-soluble polymer or a hydro-degradable polymer.

Non-limiting examples of the water-soluble polymer include ethylene vinyl alcohol, poly vinyl alcohol, poly ethylene glycol, dextrans, pullulan, poly vinyl pyrrolidone, poly acrylic acid, poly acrylamide, poly oxazoline, poly phosphates or cellulose.

Non-limiting examples of the hydro-degradable polymer is selected from the group consisting of: sugar/polysaccharide starch, polyglycolide, polycaprolactone, poly lactic acid, or polyhydroxyalkanoates.

The visual indicator may be, for example, a chromic indicator that changes color responsive to changes in a selected characteristic of the body of the molded article and/or container such as, for example, a change in a temperature, pressure or strain thereof beyond a predetermined limit.

The visual indicator may alternatively, or in addition, be incorporated on an indicator panel on the container. The indicator panel may include, for example, a sleeve arranged around the container, a label adhered to the container, or a coating thereon.

In accordance with a further aspect disclosed herein, there is provided a method for forming and recycling the molded article and container as described above. The method begins with a step of molding a molded article having a body that is configurable to define a storage vessel of the container. The molding operation is performed such that the body is formed from a first thermoplastic that is stable in contact with water and from a second thermoplastic that is unstable in contact with water, wherein the second thermoplastic carries an additive therein.

For example, the molding operation may include injecting the first thermoplastic into a molding cavity that is defined by an insert stack in a mold that is closed and clamped, to form the body of the molded article, at least in part, and injecting a second thermoplastic into the molding cavity to form a carrier layer along at least a part of the body. The carrier layer carries the additive therein.

The injecting of the first thermoplastic and the second thermoplastic may be performed one or more of sequentially and simultaneously, in whole or in part, whereby the first carrier layer is encapsulated by an outer skin layer and an inner skin layer that are formed from the first thermoplastic.

Alternative molding operations that may be suitable to form such a molded article and related container include, for example, extrusion molding, compression molding, injection-compression molding, blow-trim molding and the like.

The method may also include blow molding the molded article into the container. Alternatively, the molded article formed by injection molding may provide the finished container.

With subsequent recycling, the method may further include grinding the container into pieces, processing the pieces in a water solution to induce selective dissolution or degradation of the second thermoplastic and separating the additive and dissolution or degradation products of the second thermoplastic from the first thermoplastic by a washing step.

The method may further comprise arranging an indicator panel on the container, wherein the indicator panel is configured to provide a visual indication responsive to a change in a characteristic of the body thereof such as, for example, a change in a temperature, pressure or strain thereof beyond a predetermined limit.

In accordance with another aspect disclosed herein, there is provided another container. Like the container mentioned above, the container of the present aspect includes a body that is configurable to define a storage vessel thereof. The body is formed, at least in part, from a first thermoplastic. The container also includes a visual indicator provided thereon that is configured to provide a visual indication responsive to a change in a characteristic of the container.

The visual indicator may be, for example, a chromic indicator that changes color responsive to changes in temperature, pressure or strain beyond a predetermined limit. The strain may be the result, for example, of stress induced strain of a selected portion of the container beyond a predetermined limit.

The additive may be provided anywhere in the molded article that is visible. The molded article may have a mono-layer structure with the additive provided therein. The molded article may have a multilayer structure wherein the additive is provided in one or more of an outer skin layer, an inner skin layer or a layer disposed therebetween.

The visual indicator may be configured to provide a prominent change in appearance upon a selected container dimension of the container having crept beyond a predetermined bound with dissolution or degradation of the second thermoplastic. A suitable additive includes a chromic indicator such as, for example, colored nanospheres.

The visual indicator may alternatively be incorporated on an indicator panel on the container. The indicator panel may include, for example, a sleeve arranged around the container, a label adhered to the container, or a coating thereon. The visual indicator may be configured to provide a similar change in appearance upon a change in a characteristic of the container.

In accordance with yet a further aspect disclosed herein, there is provided a method for forming the foregoing container. The method includes molding a molded article having a body that is configurable to define a storage vessel of the container and furthermore incorporating a visual indicator anywhere on the container that is configured to provide a visual indication responsive to a change in a characteristic of the container.

The visual indicator may be, for example, a chromic indicator that changes color responsive to changes in temperature, pressure or strain beyond a predetermined limit. The strain may be the result, for example, of stress induced strain of a selected portion of the container beyond a predetermined limit.

The molding operation may include, for example, injecting a one or more thermoplastic resins into a molding cavity that is defined by an insert stack in a mold that is closed and clamped to form the body of the molded article.

The method may include providing the visual indicator as an additive that is dispersed in a thermoplastic from which the container is molded.

Alternatively, or in combination with the additive, the visual indicator may be incorporated in an indicator panel that is affixed to the container. The visual indicator may be provided, for example, by one or more of an ink, film or coating.

In accordance with yet more aspects disclosed herein, a non-transitory computer readable medium, the non-transitory computer readable medium storing computer executable instructions, which computer executable instructions when executed can cause a controller of a molding machine to execute the foregoing methods.

These and other aspects and features of non-limiting embodiments will now become apparent to those skilled in the art upon review of the following description of specific non-limiting embodiments in conjunction with the accompanying drawings.

DESCRIPTION OF THE DRAWINGS

The detailed description of illustrative (non-limiting) embodiments will be more fully appreciated when taken in conjunction with the accompanying drawings, in which.

Figures 1A, 1B:
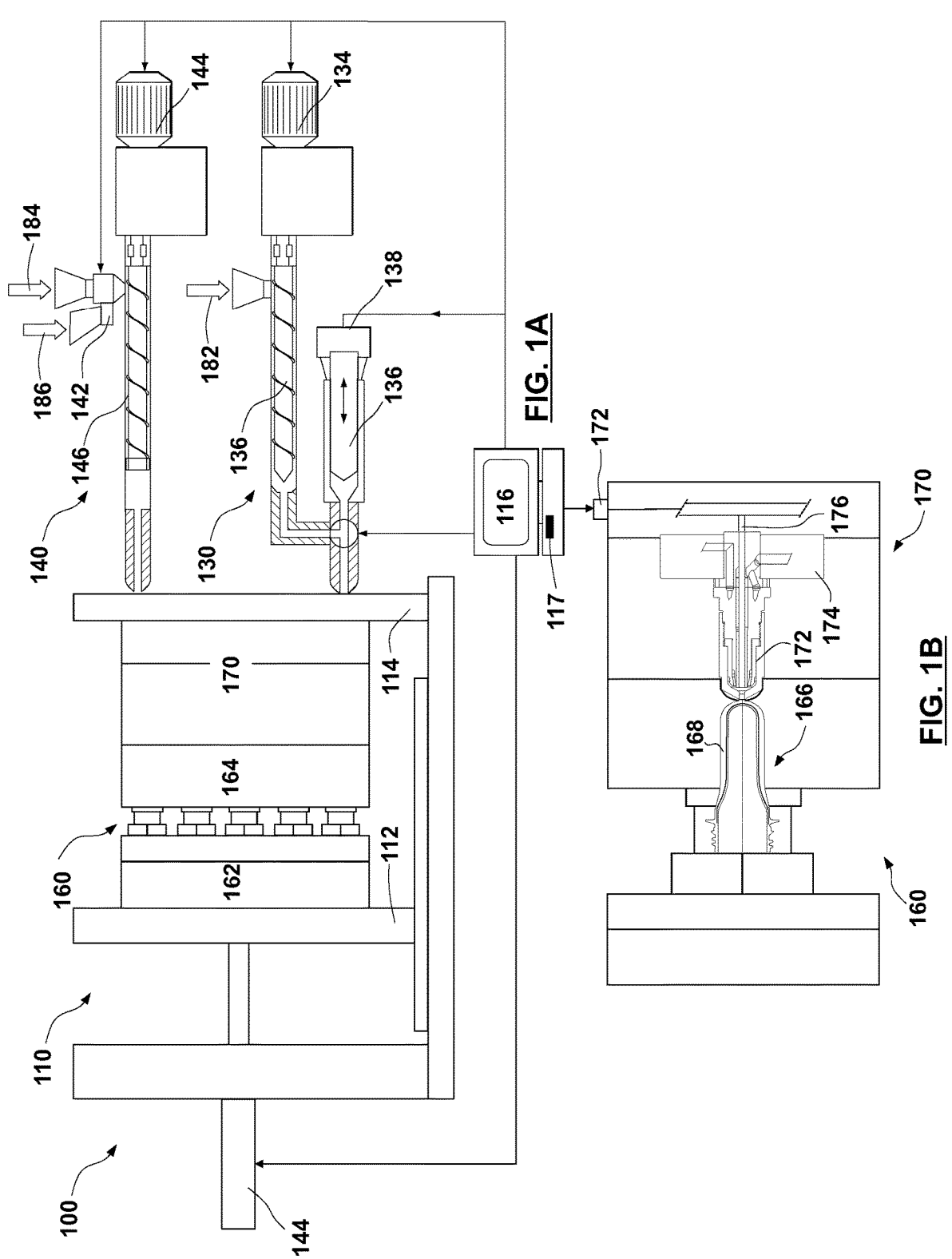
FIG. 1 depicts a molding system according to a non-limiting embodiment.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION OF THE NON-LIMITING EMBODIMENT(S)

Reference will now be made in detail to various non-limiting embodiments of a molding system, a molded article and various containers that are moldable therewith, at least in part, related methods for the molding thereof as well as a non-transitory computer readable medium storing computer executable instructions that are executable to cause a controller of the molding system machine to execute the foregoing methods. It should be understood that other non-limiting embodiments, modifications and equivalents will be evident to one of ordinary skill in the art in view of the non-limiting embodiments disclosed herein and that these variants should be considered to be within scope of the appended claims. Furthermore, it will be recognized by one of ordinary skill in the art that certain structural and operational details of the non-limiting embodiments discussed hereafter may be modified or omitted (i.e. non-essential) altogether. In other instances, well known methods, procedures, and components have not been described in detail.

It is to be further expressly understood that the molding system, molded article, containers and methods are depicted merely as an illustrative embodiment of the present technology. Thus, the description thereof that follows is intended to be only a description of illustrative examples of the present technology. This description is not intended to define the scope or set forth the bounds of the present technology. In some cases, what are believed to be helpful examples of modifications may also be set forth below. This is done merely as an aid to understanding, and, again, not to define the scope or set forth the bounds of the present technology. These modifications are not an exhaustive list, and, as a person skilled in the art would understand, other modifications are likely possible. Further, where this has not been done (i.e. where no examples of modifications have been set forth), it should not be interpreted that no modifications are possible and/or that what is described is the sole manner of implementing that element of the present technology. As a person skilled in the art would understand, this is likely not the case. In addition it is to be understood that the molding system, molded article, containers and related may provide in certain instances simple embodiments of the present technology, and that where such is the case they have been presented in this manner as an aid to understanding. As persons skilled in the art would understand, various embodiments of the present technology may be of a greater complexity. Furthermore, where specific details of the different embodiments are presented with reference to discrete embodiments, a person skilled in the art is expected to combine specific embodiment details of one discrete embodiment with specific embodiment details of another discrete embodiment, even though such a combination may not be expressly disclosed herein below.

Figures 2A, 2B, 2C, 2D:
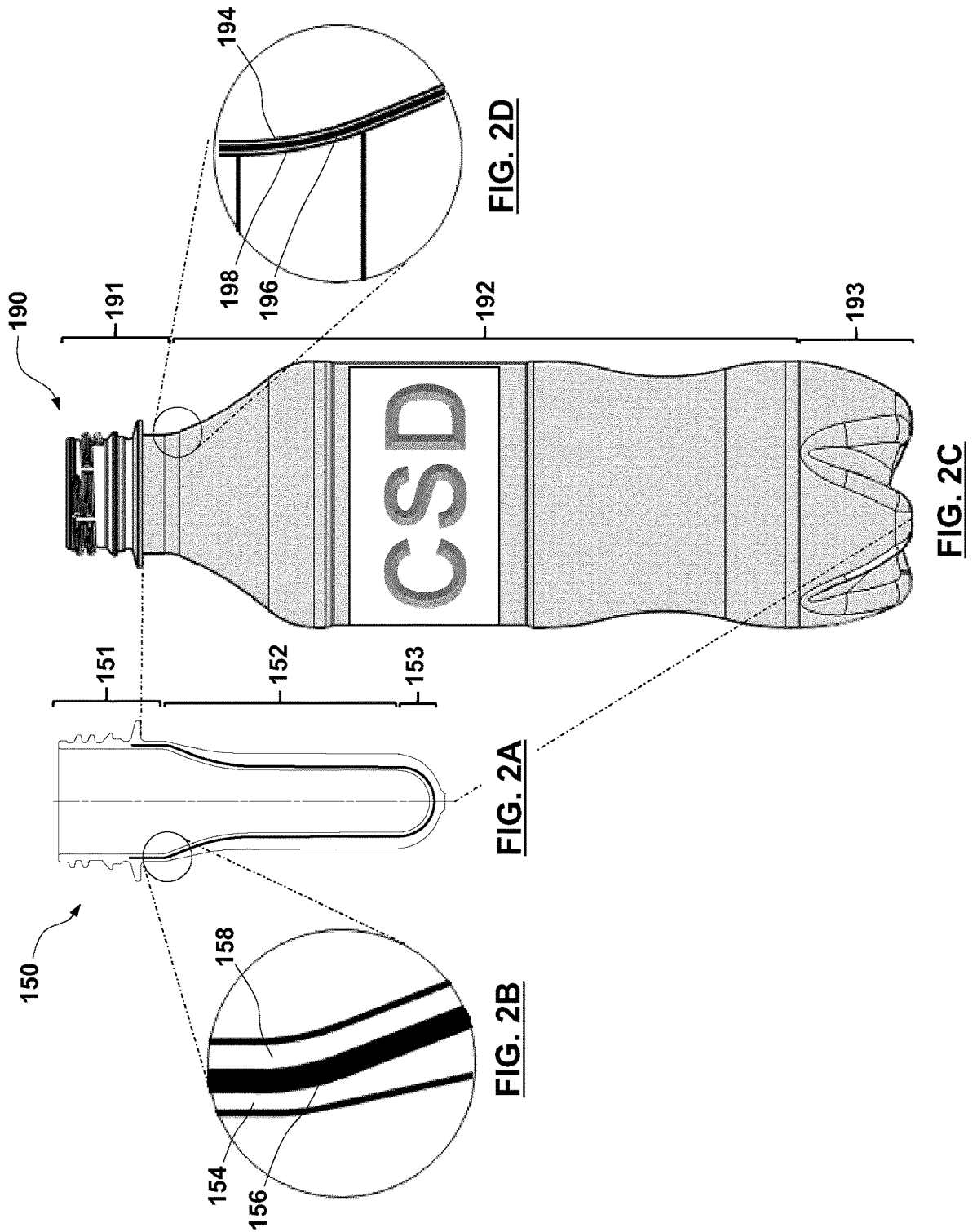
FIG. 2A depicts a non-limiting embodiment of a molded article that is moldable in a mold of the molding system of FIG. 1, the molded article configured as a preform of the type that is blow moldable to form a container.
FIG. 2B depicts an enlarged view of a wall portion of the molded article as indicated in FIG. 2A.
FIG. 2C depicts a non-limiting embodiment of a container that is blow moldable from the molded article, preform, as depicted in FIG. 2A.
FIG. 2D depicts an enlarged view of a wall portion of the container as indicated in FIG. 2C.

With reference to FIG. 1, there is depicted a schematic representation of a non-limiting embodiment of a molding system 100. The molding system 100 is configured as an injection molding system that is capable of molding molded articles. A non-limiting example of a molded article 150 that is moldable in such a system is depicted with reference to FIG. 2A. The molded article 150 is a multilayer preform of the type that is re-moldable such as, for example, with blow molding, or with liquid molding and the like, into a container 190 as depicted with reference to FIG. 2C. The molding system 100 broadly includes a clamp 110, an injection unit 130, an auxiliary injection unit 140, a mold 160, and a controller 116.

The non-limiting embodiment of the clamp 110 includes, amongst other things, a stationary platen 114 and a moveable platen 112 that are supported on a base. In operation the moveable platen 112 is moveable relative to the stationary platen 114 by means of a clamp actuator 114 for opening, closing and otherwise clamping the mold 160. The clamp actuator 144 is connected to the controller 116 whereby the controller is able to control the operation thereof.

The non-limiting embodiment of the injection unit 130 includes, amongst other things, a plasticizer 136 and a separate shooting pot 136. As such the injection unit 130 is configured as a so-called two-stage injection unit that is capable of plasticizing during injection. The plasticizer 136 is operated by a plasticizing actuator 134 for plasticizing a first thermoplastic 182 therein. The shooting pot 136 is operated by an injection actuator 138 for injecting the first thermoplastic 182 into a hot runner 170 of the mold 160. The plasticizing actuator 134 and the injection actuator 138 are connected to the controller 116 whereby the controller is able to control the operation thereof.

Likewise, the non-limiting embodiment of the auxiliary injection unit 140 includes, amongst other things, a plasticizer 146 and a plasticizing/injection actuator 144. The injection unit 140 is configured as a reciprocating screw type injection unit. The plasticizer 146 is operated by the plasticizing/injection actuator 144 for plasticizing and injecting a second thermoplastic 186 into the hot runner 170 of the mold 160. The auxiliary injection unit further includes a blender 142 at an inlet thereof. The blender 142 is configured to blend a flow of the second thermoplastic 186 in a granular un-melted state with an additive 186 such as, for example, a colorant and/or a visual indicator 299 (reference FIG. 3B) therein. The visual indicator 299 may be configured to provide a visual indication responsive to changes in temperature, pressure, or strain in the body of the molded article or container beyond a predetermined limit. The extruder/injection actuator 144 and the blender 142 are connected to the controller 116 whereby the controller is able to control the operation thereof.

The non-limiting embodiment of the mold 160 includes, amongst other things, a moveable part 163 and a stationary part 164 that may be arranged in a closed configuration, as shown, to define a molding cavity 168 therebetween and otherwise arranged in an open configuration, not shown, for removing/ejecting the molded article 150 therefrom. Accordingly, the moveable part 163 is coupled to the moving platen 112 of the clamp 110 whereas the stationary part 164 is coupled to the stationary platen 114 via a hot runner 170 that is disposed therebetween. The molding cavity 168 is defined by a mold stack 166 that includes a set of complimentary inserts that are arranged in the moveable and stationary parts of the mold 160. For purposes of a conceptual depiction of the mold only one mold stack 166 is shown whereas in practice the mold is likely to include a plurality thereof.

The hot runner 170 is configured to fluidly connect the injection unit 130 and the auxiliary injection unit 140 with the molding cavity 168. Without going into unnecessary detail, it will suffice to confirm that the hot runner 170 is typical in that it includes a nozzle 172, a manifold 174 and a nozzle valve assembly 176. The manifold 174 is arranged to connect the outlets of the injection units with inlets of the nozzle 172. The nozzle 172 is configured to split an inlet flow of the first thermoplastic 182 received from the injection unit 130, via the manifold 174, in a melted state and to direct the resulting flows towards inner and outer skin outlets (not numbered). The nozzle 172 is similarly configured to receive an inlet flow of the second thermoplastic 184 with the additive 186 entrained therein, received from the auxiliary injection unit 140, via the manifold 174, in a melted state and to direct the resulting flow towards an intermediate outlet (not numbered) that is arranged between the skin outlet channels. The nozzle valve assembly 176 includes a valve actuator 172 that is connected to the controller whereby the controller is able to control the operation thereof. Through coordinated control of the injection unit 130, the auxiliary injection unit 140 and the nozzle valve assembly 176, amongst other controllable devices, injecting of the first thermoplastic 182 and the second thermoplastic 420 through selected outlets of the nozzle 172 and into the molding cavity 168 may be performed sequentially and/or simultaneously. By so doing a carrier layer 156 (reference FIGS. 2A and 2B), composed of the second thermoplastic 184 and the additive 186, may be arranged in the molded article 150 in any desired location and distribution therein.

Within various embodiments of the present technology, the machine controller 116 can be implemented as a computing apparatus having a processor (not separately numbered). The processor may be provided through the use of dedicated hardware as well as hardware capable of executing software in association with appropriate software. The processor can execute one or more functions to control operations of one or more of the components of the molding machine 100. When provided by a processor, the functions may be provided by a single dedicated processor, by a single shared processor, or by a plurality of individual processors, some of which may be shared. In some embodiments of the present technology, the processor may be a general purpose processor, such as a central processing unit (CPU) or a processor dedicated to a specific purpose. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read-only memory (ROM) for storing software, random access memory (RAM), and non-volatile storage. Other hardware, conventional and/or custom, may also be included. The controller 116 has access to a memory (not depicted) that stores computer executable instructions 117, which computer executable instructions, when executed, cause the processor to control operation of one or more of the components of the molding machine 100.

The description shall now to the structure and steps of various non-limiting embodiments of a molded article, container, and related methods for the molding thereof, at least in part, using such a molding system 100.

With reference to FIGS. 2A, 2B, 2C and 2D there is depicted the non-limiting embodiment of the molded article 150 and the container 190 formed therefrom. In the present embodiment the molded article 150 is a multilayer preform of the type that is blow molded to form the container in a secondary operation.

The molded article 150 broadly includes a body configurable to define a storage vessel of the container 190. The body is formed from a first thermoplastic 182 that is stable in contact with water and with a second thermoplastic 184 that is unstable in contact with water, wherein the second thermoplastic 184 carries an additive 186 therein.

In this specific non-limiting embodiment, the body is a tubular body having an open end and a closed end, the body having a neck portion 151 at the open end, a base portion 153 at the closed end and a body portion 152 defined therebetween. With blow molding of such a molded article 150 (i.e. preform) the neck portion 151 of the molded article 150 is configured to define a neck part 191 of the container and is also configured to be capped to enclose a volume defined within the container 190 the body portion 152 and the base portion 153 are re-moldable to provide a body part 192 and a base part 193 of the container 190 respectively. In other embodiments, not shown, the molded article may define a finished container ready to be filled and capped (i.e. it does not require any post molding transformation through blow molding or the like).

The neck portion 151, the base portion 153 and the body portion 152 are formed, at least in part, from the first thermoplastic 182 that is stable in contact with water such as, for example, polyethylene terephthalate, high-density polyethylene, or polypropylene.

In addition, at least one of the neck portion 151, the base portion 153 and the body portion 152 includes a carrier layer 156 along at least a part thereof that is formed from a second thermoplastic 184. The carrier layer 156 also carries an additive 186 therein, such as, for example, a colorant. In the non-limiting embodiment the carrier layer is encapsulated on both sides by an inner skin layer 18 and an outer skin layer 154 as best shown with reference to FIG. 2B. In the non-limiting embodiment the carrier layer 156 is configured to extend along both the body portion 152 and the base portion 153 so that with blow molding thereof into the body part 192 and the base part 193 of the container 190 the container is provided with a colored appearance by virtue of the colorant that is dispersed within the carrier layer 196 in the container (stretched from the carrier layer 156 of the molded article 150). The foregoing is merely a non-limiting embodiment and it should be recognized that the carrier layer may have any configuration or location within the molded article 150.

The second thermoplastic 184 may be selected to be unstable in contact with water (i.e. soluble and/or degradable) such as, for example, a water-soluble polymer or a hydro-degradable polymer. Suitable water-soluble polymer may include ethylene vinyl alcohol, poly vinyl alcohol, poly ethylene glycol, dextrans, pullulan, poly vinyl pyrrolidone, poly acrylic acid, poly acrylamide, poly oxazoline, poly phosphates or cellulose. Likewise, suitable hydro-degradable polymers may include sugar/polysaccharide starch, polyglycolide, polycaprolactone, poly lactic acid, or poly-hydroxyalkanoates. A technical effect of the foregoing may include improved recyclability of the container. With recycling of the container 190 the additive 186 and the second thermoplastic 184 are rendered separable from the first thermoplastic 182 with a grinding of the container 190 into pieces and then processing them in a water solution to induce selective dissolution or degradation of the second thermoplastic 184.

To protect the second thermoplastic 184 from degrading prematurely, during the useful life of the container, the carrier layer 156 may be encapsulated between skin layers of the first thermoplastic 182. More particularly, the carrier layer 156 is encapsulated by the outer skin layer 154 and the inner skin layer 158 that are formed from the first thermoplastic 182. In other embodiments, not shown, the molded article and the resultant blown container may be configured to include multiple overlapping carrier layers wherein one or more of the carrier layers is sandwiched between adjacent layers that may or may not be a skin layer. A specific example to illustrate the foregoing is a molded article having five layers wherein the outermost skin layers and the middle layer are made from the first thermoplastic 182, stable in contact with water, whereas the remaining layers are carrier layers, that is, a first carrier layer that is sandwiched between an inner skin layer and the middle layer and a second carrier layer that is sandwiched between an outer skin layer and the middle layer, are made from the second thermoplastic 184, that is unstable in contact with water, and wherein at least one of these carrier layers carry an additive and possibly different additives. Those of skill in the art will recognize that other layer configurations are possible.

To further improve the recyclability of the container 190 the first thermoplastic 182 is devoid of the additive 186. That is, with separation of the first and second thermoplastics in the recycling process, preferably with dissolution/hydrolyzing of the second thermoplastic 184, the first thermoplastic 182 is devoid of any additive, such as a colorant, whereby segregation by color is eliminated and it can be readily cleaned and reused.

Figures 3A, 3B:
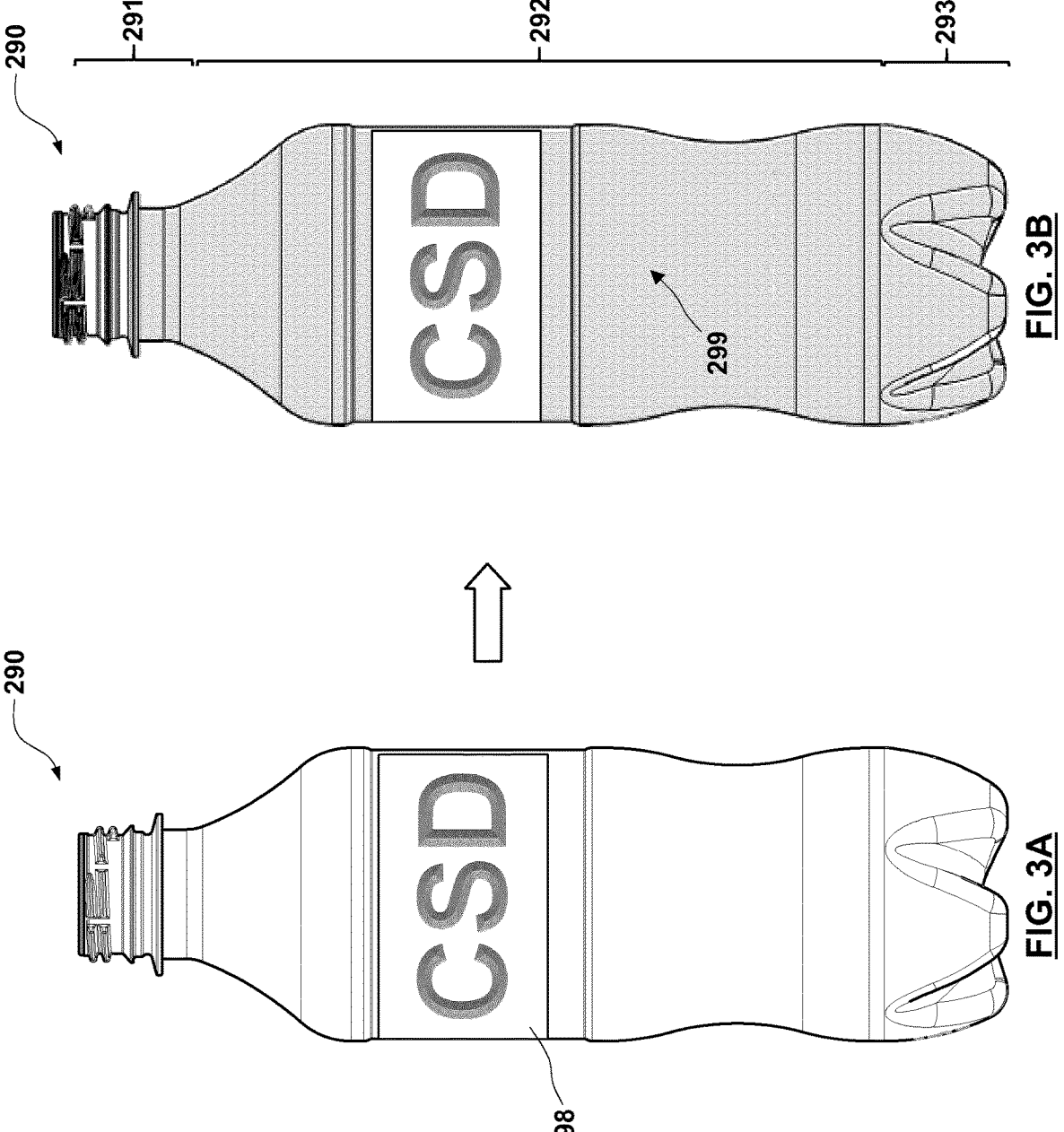
FIGS. 3A and 3B depict a non-limiting embodiment of a transformational sequence of another non-limiting embodiment of a container wherein a visual indication is apparent in the appearance of a body and base portion of the container with dimensional creep thereof beyond a pre-determined limit.

With reference to FIGS. 3A and 3B there is depicted another non-limiting embodiment of a container 290. The container 290 is identical to the container 190 shown in FIG. 2C with the exception that a different additive is dispersed in the carrier layer disposed therein. The additive is a visual indicator 299 that is configured to provide a visual indication responsive to changes in a characteristic of the body such as, for example, temperature, pressure, or stress induced strain beyond a predetermined limit. The foregoing may be appreciated by contrasting the hue of the body part 292 and base part 293 of the container 290 in FIGS. 3A and 3B. Specifically, in FIG. 3A the body part 292 and the base part 293 appear to be generally clear (i.e. transparent) whereas in FIG. 3B these same parts become visibly shaded. For example, the color change may occur responsive to a change in a temperature of the container beyond a predetermined limit. As a further example, the color change may occur responsive to bottle creep (i.e. an increasing dimensional change of the bottle wider and taller) that is driven by the internal pressure within the container, such as from carbonated products therein, and the dissolution or degradation of the carrier layer due to the inevitable migration of moisture through the skin layers. In other words, the dimensional creep of the container comes about as the second thermoplastic 184 therein degrades thereby triggering a visual indication as to the likely status of the contents of the container such as, for example, whether a carbonated soft drink (CSD) is likely to have significantly diminished carbonation. In accordance with a specific non-limiting example, the visual indicator is configured to provide a prominent change in appearance upon a selected container dimension of the container 290 having crept beyond a pre-determined bound with dissolution or degradation of the second thermoplastic.

Many suitable visual indicator are possible. A non-limiting example may include a chromic indicator, such as, for example, thermochromic or piezochromic indicator. A specific example of a piezochromic indicator includes colored nanospheres (reference paper titled "Colorimetric Stress Memory Sensor Based on Disassembly of Gold Nanoparticle Chains", by Xiaogang Han, Yiding Liu, and Yadong Yin of the University of California at Riverside, published as DOI: 10.1021/nl500144k from the American Chemical Society). Other possible visual indicators may be adapted from the body of known piezochromic indicators that exist in the marketplace such as, for example, Pressurex® (a registered trademark of Sensor Products, Inc. of New York USA) and so-called 'smart pigments' such as those from Olikrom of Pessac France.

Figures 4A, 4B:
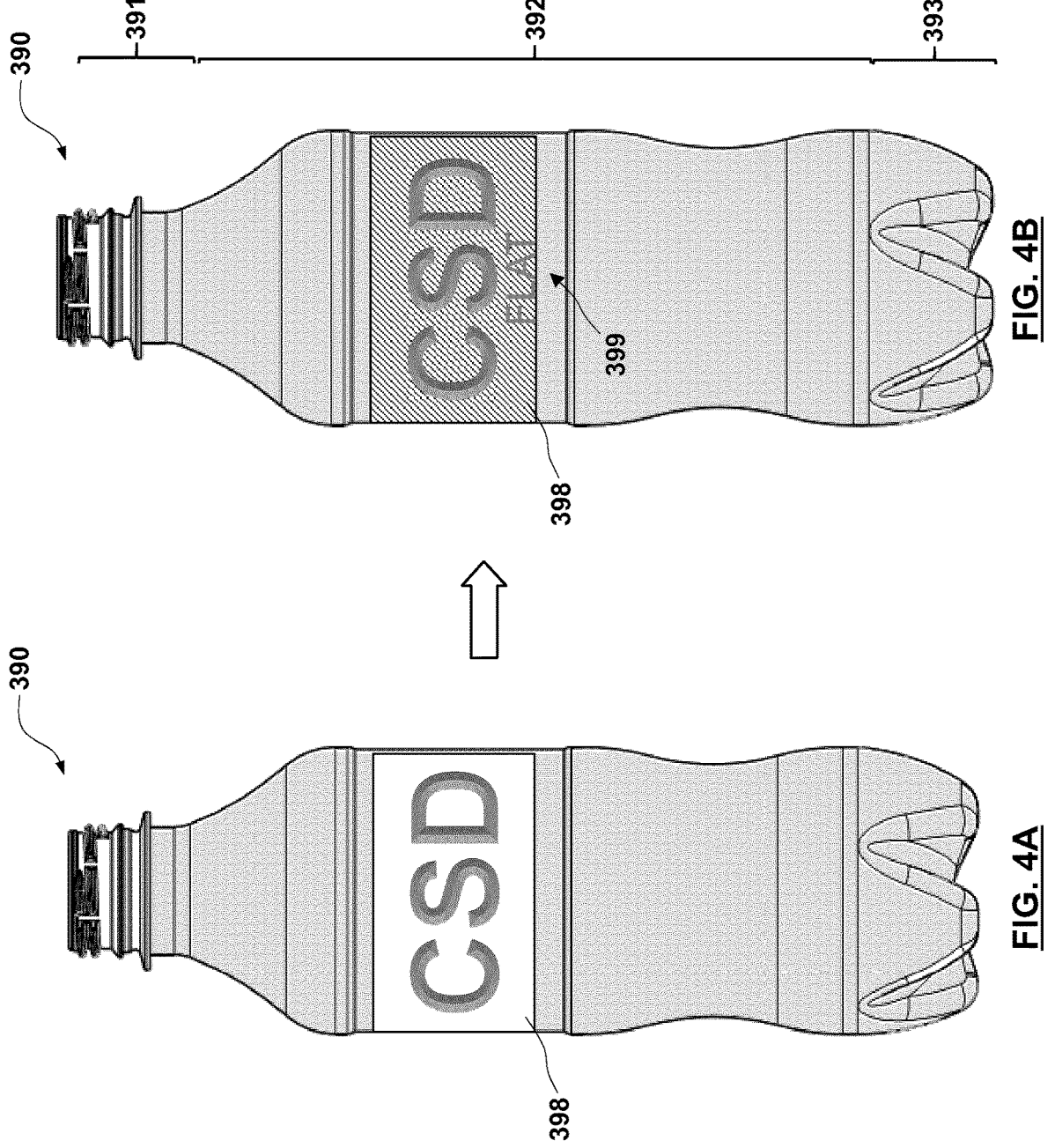
FIGS. 4A and 4B depict another non-limiting embodiment of a transformational sequence of an indicator panel that is affixed to the container of FIG. 2C wherein a visual indication is apparent in the appearance of the indicator panel with dimensional creep of an underlying region of the body portion of the container.

With reference to FIGS. 4A and 4B there is depicted another non-limiting embodiment of a container 390. The container 390 is identical to the container 190 shown in FIG. 2C with the exception that it further includes an indicator panel 398 affixed thereto in place of a typical product label. The indicator panel 398 is configured to provide a visual indication responsive to changes in a characteristic of the body such as, for example, temperature, pressure, or stress induced strain beyond a predetermined limit. Accordingly instead of integrating the visual indicator into the carrier layer of the container, or alternatively in addition thereto, it is disposed on an exterior surface of the container 390. In accordance with a specific non-limiting example, the visual indicator 399 is configured to provide a prominent change in appearance upon a selected container dimension of the container 390 having crept beyond a pre-determined bound with dissolution or degradation of the second thermoplastic. Suitable visual indicators may include chromic indicators in the form of ink, film or a coating.

Figure 5:
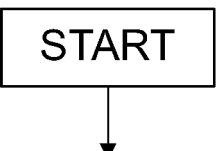
FIG. 5 depicts a non-limiting embodiment of a method for the molding of the containers of FIGS. 2C and 3A.
Figure 5:
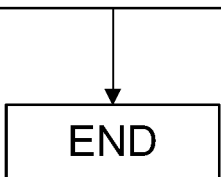

Having described various non-limiting embodiments of the molded article and related container formed therefrom the description shall now turn to a complimentary description of underlying methods for the forming and recycling thereof. With reference to FIG. 5 there is depicted a simplified flow chart of a method 400. The method includes molding 410 the molded article 150 having a body that is configurable to define a storage vessel of the container 190, wherein the body is formed from a first thermoplastic 182 that is stable in contact with water and from a second thermoplastic 184 that is unstable in contact with water and wherein the second thermoplastic 184 carries an additive 186 therein.

The molding operation 410 may be performed by various means such, for example, the injection molding system 100 (FIG. 1) described previously, or alternatively molding systems (not shown) that are configured for extrusion molding, compression molding, injection-compression molding, blow-trim molding and the like.

In accordance with a specific non-limiting example, the molding operation 410 may include injection molding the molded article 150 having a tubular body that includes an open end and a closed end, the body having a neck part 191 at the open end, a base part 193 at the closed end and a body part 192 defined therebetween, wherein the neck portion 151 of the molded article 150 is configured to define a neck part 191 of the container and is also configured to be capped to enclose a volume defined within the container 190, 290, 390 and the body portion 152 and the base portion 153 are adaptable to provide a body part 192, 292, 392 and a base part 193, 293, 393 of the container 190, 290, 390, respectively.

The molding operation 410 may include injecting a first thermoplastic 182 into a molding cavity 168 that is defined by an insert stack 166 in a mold 160 that is closed and clamped, wherein the first thermoplastic 182 is stable in contact with water, to form one or more of the neck portion 151, the base portion 153 and the body portion 152 at least in part. Furthermore the method 400 may include a step of injecting a second thermoplastic 184 into the molding cavity 168, wherein the second thermoplastic 184 is unstable in contact with water, to form a carrier layer 196 along at least a part of one or more of the neck portion 151, the base portion 153 and the body portion 152. In the second injection step, 420, the additive 186 is added into the second thermoplastic 182 so as to be entrained therewith for dispersion into the carrier layer 196. The foregoing step may be accomplished by various means a selection of which depends on the nature of the additive. In the non-limiting example provided herein the additive is dispersed with the second thermoplastic by the blender 142 that is disposed at the inlet to the auxiliary injection unit 140 (reference FIG. 1).

The method 400 may also include re-molding or otherwise transforming the molded article 150 into the container 190, 290, 390 such as, for example, with blow molding or liquid molding thereof. In other non-limiting embodiments, not shown, the molded article may provide a finished container.

Upon use of the container it may be directed to recycling. In such a scenario the method 400 may be said to further include additional steps of grinding the container 190, 290, 390 into pieces, processing the pieces in a water solution to induce dissolution or degradation of the second thermoplastic 184 and separating the additive 186 and degradation products of the second thermoplastic 184 from the first thermoplastic 182.

To improve the efficiency of the recycling operations the first injection step, 410, may be performed such that the first thermoplastic 182 is devoid of any additive therein for reasons set forth earlier in the description.

Without specific limitation, the injecting 410, 420 of the first thermoplastic 182 and the second thermoplastic 420 are performed one or more of sequentially or simultaneously, in whole or in part, whereby the first carrier layer 196 is encapsulated by an outer skin layer 194 and an inner skin layer 198 that are formed from the first thermoplastic 182.

Consistent with the non-limiting embodiments described previously, the first thermoplastic 182 may include one of polyethylene terephthalate, high-density polyethylene, or polypropylene. Likewise, the second thermoplastic 184 may be one or more of a water-soluble polymer or a hydro-degradable polymer as listed previously.

As described previously, the additive 186 added in the second injection step may include, without specific limitation thereto, a colorant or a visual indicator. The visual indicator may be configured, for example, to provide a visual indication responsive to changes in temperature, pressure or strain in the body of the molded article and/or resultant container beyond a predetermined limit.

In accordance with some non-limiting embodiments, the method 400 may further include the step of arranging or otherwise affixing the indicator panel 398 on the container, wherein the indicator panel 398 is similarly configured to provide a visual indication responsive to changes in temperature, pressure or stress induced strain in the body of the molded article and/or resultant container beyond a predetermined limit.

Figure 6:
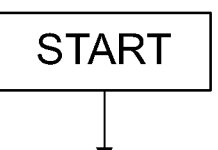
FIG. 6 depicts a non-limiting embodiment of a method for the molding of the container of FIG. 4A.
Figure 6:
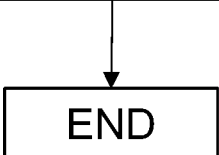

A subtle variation on the foregoing method is illustrated with reference to FIG. 6 wherein there is depicted a simplified flow chart of a method 500. The method 500 is distinct from the foregoing method in that it is not limited to the addition of an additive within a carrier layer of a molded article or even to the provision of a multilayer molded article, although this is contemplated and otherwise included as optional structure and steps. Rather the method broadly provides for the provision of a visual indicator on a container, however integrated, for sake of providing a visual indication responsive to changes in temperature, pressure or stress induced strain in the body of the molded article and/or resultant container beyond a predetermined limit.

More specifically, the method 500 may include molding 510 the molded article 150 having a body that is configurable to define a storage vessel of the container 190, 290, 390. The method may further include incorporating 520 a visual indicator 199, 299, 399 anywhere on the container that is configured to provide a visual indication responsive to a change in a characteristic of the container 190, 290, 390.

The molding operation 510 may be performed by various means such as, for example, the injection molding system 100 (FIG. 1) described previously, or alternatively molding systems (not shown) that are configured for extrusion molding, compression molding, injection-compression molding, blow-trim molding and the like.

In accordance with a specific non-limiting example, the molding operation 510 may begin with a step of injection molding a molded article 150 having a tubular body that includes an open end and a closed end, the body having a neck part 191 at the open end, a base part 193 at the closed end and a body part 192 defined therebetween, wherein the neck portion 151 of the molded article 150 is configured to define a neck part 191 of the container and is also configured to be capped to enclose a volume defined within the container 190, 290, 390 and the body portion 152 and the base portion 153 are adaptable to provide a body part 192, 292, 392 and a base part 193, 293, 393 of the container 190, 290, 390, respectively.

The injection molding of the molded article 150 includes injecting a first thermoplastic 182 into a molding cavity 168 that is defined by an insert stack 166 in a mold 160 that is closed and clamped to form one or more of the neck portion 151, the base portion 153 and the body portion 152 at least in part.

Next the method 500 includes incorporating 520 a visual indicator 199, 299, 399 anywhere on the container that is configured to provide a visual indication responsive to a change in a characteristic of the body thereof such as, for example, a change in a temperature, pressure or stress induced strain of a selected portion of the container beyond a predetermined limit.

In one non-limiting embodiment, the visual indicator 299 may be provided by an additive in a thermoplastic from which the container is molded. In keeping with the foregoing, the additive may be provided in one or more of an outer skin layer 194, an inner skin layer 198 or a layer 196 disposed therebetween.

The visual indicator 299, 399 may include a chromic indicator such as, for example, a thermochromic, or piezochromic indicator. In the latter example, the visual indicator 399 is configured to provide a prominent change in appearance upon a selected container dimension of the container 390 having crept beyond a pre-determined bound.

Alternatively, the visual indicator may be provided in an indicator panel 398 that is incorporated onto the container in a post-forming operation (e.g. label applicator, printing, coating etc.). In such an embodiment the visual indicator 399 may be provided by one or more of an ink, film or coating.

To perform such methods, 400, 500, using automated machinery such as the molding system 100, perhaps in conjunction with further downstream equipment such as a blow molding machine, filling and capping equipment and a label applicator, a non-transitory computer readable medium 117 may be provided, the non-transitory computer readable medium storing computer executable instructions, which computer executable instructions when executed can cause a controller 116 of a molding machine 100 to execute the method.

Having described various non-limiting embodiments of structure and steps for the molding of molded articles (e.g. preform) and containers re-moldable therefrom it is worthwhile noting that the shape and configuration thereof is not particularly limited. More generally, a preform has any intermediate shape suitable to form a container (this would include discs, typical preforms of any shape, extruded tubes etc.). For example, the body of the molded article (e.g. preform) may be hollow and have one or more surface that is, for example, cylindrical, tubular, conical, ovoid, rectangular. As a further example, the body may define a solid block (i.e. not hollow) such as a disc-shape, wherein the block is re-moldable to define the container. The foregoing will be further illustrated with the additional non-limiting embodiments that follow.

Likewise, the container is any shaped, formed, or assembled 3-dimensional structure suitable to contain a gas, liquid, or solid media or a combination thereof. For example, the container may have a typical hollow cylindrical shape. Alternatively, the container may have a more intricate shape such as those typically used for packaging personal care products, specific examples include containers that are oval, have an offset neck or that have a square shape.

Figure 8:
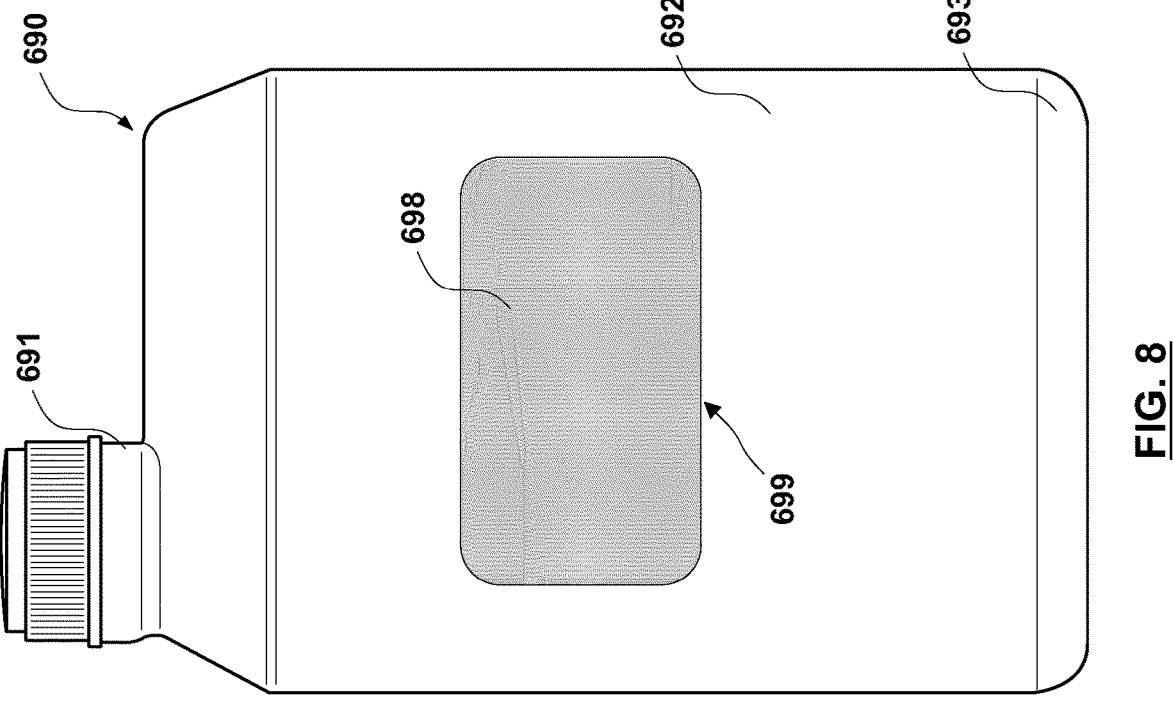
FIG. 8 depicts a non-limiting embodiment of a container that is moldable from the molded article as depicted in FIG. 7.
Figure 7:
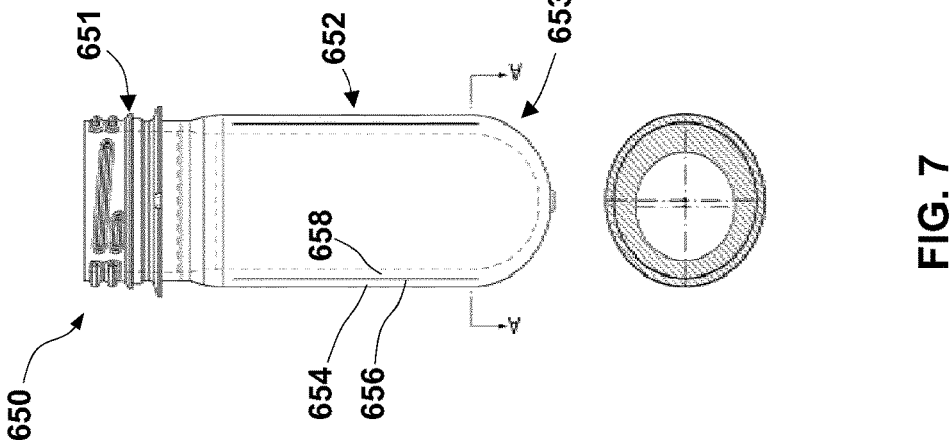
FIG. 7 depicts a non-limiting embodiment of a molded article that is configurable to define a container.

With reference to FIGS. 7 and 8 there is depicted another non-limiting embodiment of a molded article 650 (e.g. preform) that is configured for remolding into a container 690 having an offset neck 691. The molded article 650 broadly includes a body configurable to define a storage vessel of the container 690. More specifically, the body is a hollow body having an open end and a closed end, the body having a neck portion 651 at the open end, a base portion 653 at the closed end and a body portion 652 defined therebetween. The surfaces that define the body portion 652 are non-concentric, non-uniform cylinders, whereby the thickness of the wall of the body portion 652 defined therebetween varies around a circumference thereof. A technical effect of the foregoing non-uniform distribution of thermoplastic in the molded article may include improved wall thickness uniformity in the corresponding body portion 652 and base portion 653 of the container 690 upon the re-molding thereof. The molded article 650 may have a multilayer structure as shown wherein a second thermoplastic is provided in a carrier layer 656 that is encapsulated by an outer skin layer 654 and an inner skin layer 658 that are formed from the first thermoplastic. Alternative embodiments of the molded article 650 are contemplated having different multilayer structure as well those having a monolayer construction.

The non-limiting embodiment of the container 690 is further characterized in that it also includes an indicator panel 698 affixed thereto. The indicator panel 698 is configured to provide a visual indication responsive to changes in a characteristic of the body such as, for example, temperature, pressure, or stress induced strain beyond a predetermined limit. More particularly in the present non-limiting embodiment the indicator panel 698 includes a visual indicator 699 thereon that is configured to provide a prominent change in color upon change in temperature of the body of the container.

Figures 9, 10, 11, 12:
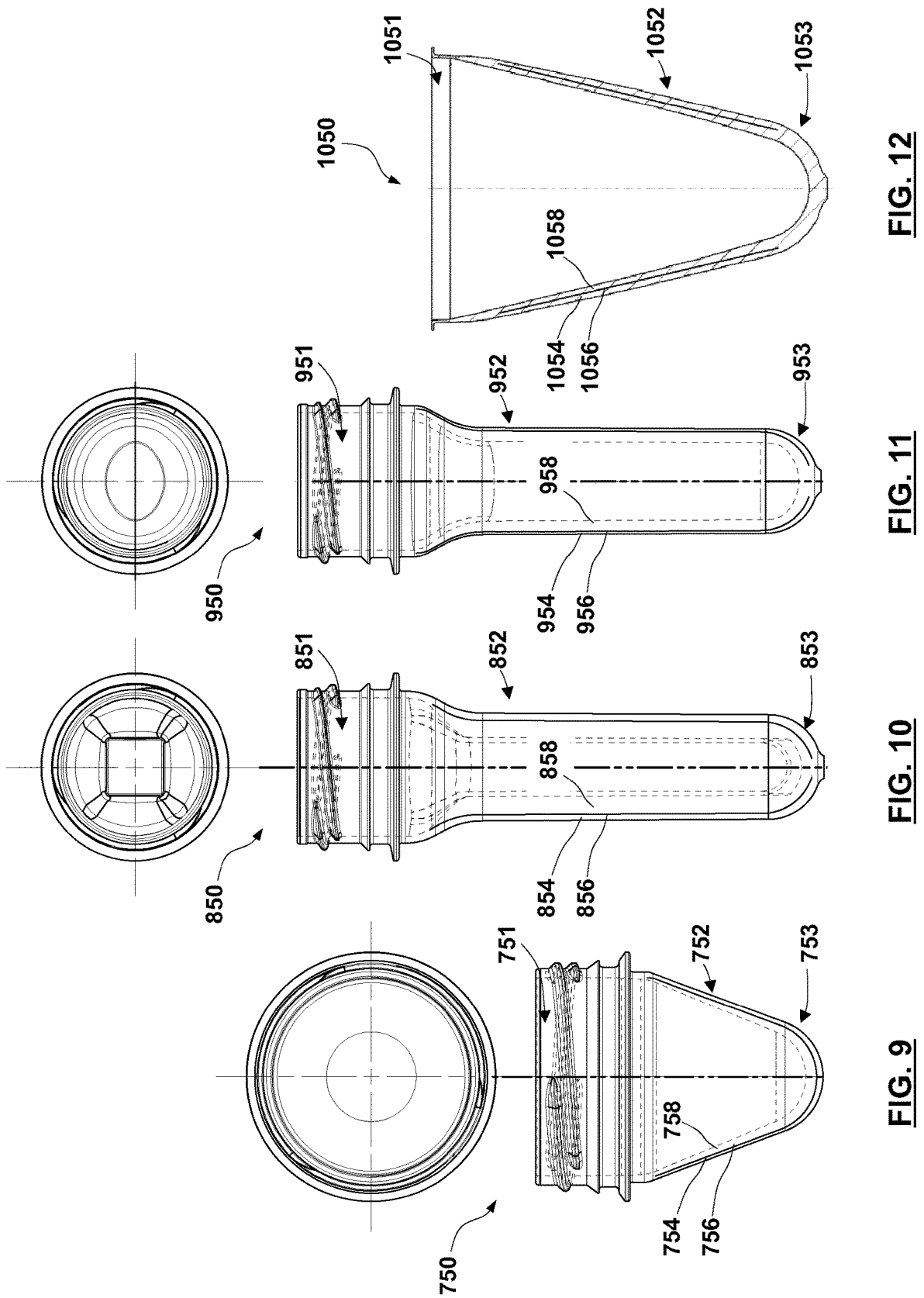
FIG. 9-12 depict additional non-limiting embodiments of molded articles that are configurable to define a container.

With reference to FIG. 9 there is depicted another non-limiting embodiment of a molded article 750 (e.g. preform) that is configured for remolding into a container (not shown). The molded article 750 broadly includes a body configurable to define a storage vessel of the container. More specifically, the body is a hollow body having an open end and a closed end, the body having a neck portion 751 at the open end, a base portion 753 at the closed end and a body portion 752 defined therebetween. The neck portion 751 is characterized in that it is disproportionately wide having a so-called 'wide mouth'. The surfaces that define the body portion 752 are conical. The inner and outer conical surfaces of the tubular part are concentric, whereby the thickness of the wall of the body portion 752 defined therebetween is generally uniform around a circumference thereof. That being said in another non-limiting embodiment the conical surfaces may be non-concentric so as to vary the wall thickness in the body portion similar to the preceding embodiment. The molded article 750 may have a multilayer structure as shown wherein a second thermoplastic is provided in a carrier layer 756 that is encapsulated by an outer skin layer 754 and an inner skin layer 758 that are formed from the first thermoplastic. Alternative embodiments of the molded article 750 are contemplated having different multilayer structure as well those having a monolayer construction.

With reference to FIG. 10 there is depicted another non-limiting embodiment of a molded article 850 (e.g. preform) that is configured for remolding into a non-round container (not shown). The molded article 850 broadly includes a body configurable to define a storage vessel of the container. More specifically, the body is a hollow body having an open end and a closed end, the body having a neck portion 851 at the open end, a base portion 853 at the closed end and a body portion 852 defined therebetween. The surfaces that define the body portion 852 have different configurations wherein the outer surface is generally cylindrical and the inner surface is generally rectangular, whereby the thickness of the wall of the body portion 952 defined therebetween varies around a circumference thereof.

A technical effect of the foregoing non-uniform distribution of thermoplastic in the molded article may define corresponding structural features in the corresponding body portion and base portion of the container (not shown) upon the re-molding thereof. The molded article 850 may have a multilayer structure as shown wherein a second thermoplastic is provided in a carrier layer 856 that is encapsulated by an outer skin layer 854 and an inner skin layer 858 that are formed from the first thermoplastic.

Alternative embodiments of the molded article 850 are contemplated having different multilayer structure as well those having a monolayer construction.

With reference to FIG. 11 there is depicted another non-limiting embodiment of a molded article 950 (e.g. preform) that is configured for remolding into a container (not shown). The molded article 950 broadly includes a body configurable to define a storage vessel of the container. More specifically, the body is a hollow body having an open end and a closed end, the body having a neck portion 951 at the open end, a base portion 953 at the closed end and a body portion 952 defined therebetween. The surfaces that define the body portion 952 have different configurations wherein the outer surface is generally cylindrical and the inner surface is generally ovoid, whereby the thickness of the wall of the body portion 952 defined therebetween varies around a circumference thereof. A technical effect of the foregoing non-uniform distribution of thermoplastic in the molded article may include a generally uniform wall thickness in an oval shaped container re-molded therefrom. The molded article 950 may have a multilayer structure as shown wherein a second thermoplastic is provided in a carrier layer 956 that is encapsulated by an outer skin layer 954 and an inner skin layer 958 that are formed from the first thermoplastic. Alternative embodiments of the molded article 950 are contemplated having different multilayer structure as well those having a monolayer construction.

While many more non-limiting embodiments of the molded article (e.g. preform) are contemplated it will suffice to close with one additional embodiment as shown with reference to FIG. 12 there is depicted another non-limiting embodiment of a molded article 1050 (e.g. preform) that is configured for remolding into a container (not shown). The molded article 1050 broadly includes a body configurable to define a storage vessel of the container (not shown). More specifically, the body is a hollow body having an open end 1051 and a base portion 1053 at a closed end and a body portion 1052 defined therebetween. In contrast with the preceding embodiments the open end 1051 does not include a neck finish in the traditional sense for releasably receiving a closure. Rather, the open end 1051 is configured for receiving a cap thereon. Also of note, the surfaces that define the body portion 1052 are both conical. The inner and outer conical surfaces of the body portion 1052 are concentric, whereby the thickness of the wall of the body defined therebetween is generally uniform around a circumference thereof. That being said in another non-limiting embodiment the conical surfaces may be non-concentric so as to vary the wall thickness in the body portion similar to the preceding embodiment. As shown, the molded article 1050 may have a multilayer structure as shown wherein a second thermoplastic is provided in a carrier layer 1056 that is encapsulated by an outer skin layer 1054 and an inner skin layer 1058 that are formed from the first thermoplastic. Alternative embodiments of the molded article 1050 are contemplated having different multilayer structure as well those having a monolayer construction.

Various embodiments having been thus described in detail by way of example, it will be apparent to those skilled in the art that variations and modifications may be made without departing from the invention. The invention includes all such variations and modifications as fall within the scope of the appended claims. As such, the described non-limiting embodiment(s) ought to be considered to be merely illustrative of some of the more prominent features and applications. Other beneficial results can be realized by applying the non-limiting embodiments in a different manner or modifying them in ways known to those familiar with the art. This includes the mixing and matching of features, elements and/or functions between various non-limiting embodiment(s) is expressly contemplated herein so that one of ordinary skill in the art would appreciate from this disclosure that features, elements and/or functions of one embodiment may be incorporated into another embodiment as skill in the art would appreciate from this disclosure that features, elements and/or functions of one embodiment may be incorporated into another embodiment as appropriate, unless described otherwise, above. Although the description is made for particular arrangements and methods, the intent and concept thereof may be suitable and applicable to other arrangements and applications.

What is claimed is:

1. A molded article for providing a container, the molded article comprising:
   a body configurable to define a storage vessel of the container;
   wherein the body includes a carrier layer along at least a part thereof that is encapsulated by an outer skin layer and an inner skin layer, wherein the outer skin layer and the inner skin layer are formed from a first thermoplastic that is stable in contact with water and the carrier layer is formed from a second thermoplastic that is unstable in contact with water,
   wherein a colorant is dispersed within the carrier layer, and
   wherein the outer skin layer and the inner skin layer formed from the first thermoplastic are devoid of any colorant.

2. The molded article of claim 1, wherein the body is a preform at least a portion of which is re-moldable to define the container.

3. The molded article of claim 2, wherein the body of the preform is one of hollow or a solid block, at least in part.

4. The molded article of claim 3, wherein the body is a hollow body, and wherein one or more surfaces of the hollow body are one or more of cylindrical, conical, rectangular or ovoid in shape.

5. The molded article of claim 3, wherein the body is a hollow body, and wherein surfaces of the hollow body are one of concentric or non-concentric for remolding into the container having an offset neck.

6. The molded article of claim 3, wherein the body further includes an open end and a closed end.

7. The molded article of claim 6, wherein the open end defines a neck portion and the closed end defines a base portion, wherein the neck portion is configured to define a neck part of the container and is also configured to be capped to enclose a volume defined within the container, wherein a body portion and the base portion are blow moldable to provide a body part and a base part of the container, respectively.

8. The molded article of claim 3, wherein the preform includes a neck portion having a wide mouth and a body portion that is conical.

9. The molded article of claim 3, wherein the preform is configured for blow and trim molding into the container.

10. The molded article according to claim 1, wherein the first thermoplastic is one of polyethylene terephthalate, high-density polyethylene, or polypropylene.

11. The molded article according to claim 1, wherein the second thermoplastic is one of a water-soluble polymer or a hydro-degradable polymer.

12. The molded article of claim 11, wherein the water-soluble polymer is selected from the group consisting of: ethylene vinyl alcohol, poly vinyl alcohol, poly ethylene glycol, dextrans, pullulan, poly vinyl pyrrolidone, poly acrylic acid, poly acrylamide, poly oxazoline, poly phosphates or cellulose.

13. The molded article of claim 11, wherein the hydro-degradable polymer is selected from the group consisting of: sugar/polysaccharide starch, polyglycolide, polycaprolactone, poly lactic acid, or polyhydroxyalkanoates.

14. The molded article according to claim 1, further comprising an additive configured to provide a visual indication responsive to one or more of stress induced strain of the body beyond a predetermined limit and temperature change of the body.

15. The molded article of claim 14, wherein the visual indicator is configured to provide a prominent change in appearance upon a selected container dimension of the container having crept beyond a pre-determined bound with dissolution or degradation of the second thermoplastic.

16. The molded article according to claim 1, further comprising a chromic indicator that is configured to change color responsive to a change in a characteristic of the body.

17. A container, comprising:

a body configured to define a storage vessel;

wherein the body includes a carrier layer along at least a part thereof that is encapsulated by an outer skin layer and an inner skin layer, wherein the outer skin layer and the inner skin layer are formed from a first thermoplastic that is stable in contact with water and the carrier layer is formed from a second thermoplastic that is unstable in contact with water, wherein a colorant is dispersed within the carrier layer, and wherein the outer skin layer and the inner skin layer formed from the first thermoplastic are devoid of any colorant.

18. The container of claim 17, wherein body includes a neck part at an open end, a base part at a closed end and a body part defined therebetween.

19. The container of claim 18, wherein the neck part is offset with respect to at least one of the body part and the base part.

20. The container according to claim 17, wherein the first thermoplastic is one of polyethylene terephthalate, high-density polyethylene, or polypropylene.

21. The container according to claim 20, wherein the second thermoplastic is one of a water-soluble polymer or a hydro-degradable polymer.

22. The container of claim 21, wherein the water-soluble polymer is selected from the group consisting of: ethylene vinyl alcohol, poly ethylene glycol, dextrans, pullulan, poly vinyl pyrrolidone, poly acrylic acid, poly acrylamide, poly oxazoline, poly phosphates or cellulose.

23. The container of claim 21, wherein the hydro-degradable polymer is selected from the group consisting of: sugar/polysaccharide starch, polyglycolide, polycaprolactone, poly lactic acid, or polyhydroxyalkanoates.

24. The container according to claim 17, further comprising an additive which provides a visual indicator responsive to one or more of stress induced strain beyond a predetermined limit and temperature change of the body.

25. The container according to claim 17, further comprising a chromic indicator that is configured to change color responsive to a change in a characteristic of the body.

26. The container of claim 24, wherein the visual indicator is configured to provide a prominent change in appearance upon a selected container dimension of the container having crept beyond a pre-determined bound with dissolution or degradation of the second thermoplastic.

27. The container of claim 17, further comprising an indicator panel that is configured to provide a visual indication responsive to one or more of stress induced strain of the body beyond a predetermined limit and temperature change of the body.

28. The container of claim 24, wherein the visual indicator is configured to provide a prominent change in appearance upon a selected container dimension of the container having crept beyond a pre-determined bound with dissolution or degradation of the second thermoplastic.

29. The container of claim 24, wherein the visual indicator is provided by one or more of an ink, film or coating.

30. A method for forming and recycling a container, comprising:

molding a molded article having a body that is configurable to define a storage vessel of the container;

wherein the body includes a carrier layer along at least a part thereof that is encapsulated by an outer skin layer and an inner skin layer, wherein the outer skin layer and the inner skin layer are formed from a first thermoplastic that is stable in contact with water and the carrier layer is formed from a second thermoplastic that is unstable in contact with water, wherein a colorant is dispersed within the carrier layer, and wherein the outer skin layer and the inner skin layer formed from the first thermoplastic are devoid of any colorant.

31. The method of claim 30, wherein the molding of the molded article further includes injection molding the body with:

injecting the first thermoplastic into a molding cavity that is defined by an insert stack in a mold that is closed and clamped to form one or more of a neck portion, a base portion and a body portion at least in part; and injecting the second thermoplastic into the molding cavity to form the carrier layer along at least a part of one or more of the neck portion, the base portion and the body portion wherein the carrier layer carries the colorant therein.

32. The method of claim 30, further comprising blow molding the molded article into the container.

33. The method of claim 30, further comprising grinding the container into pieces, processing the pieces in a water solution to induce selective dissolution or degradation of the second thermoplastic and separating the colorant and degradation products of the second thermoplastic from the first thermoplastic.

34. The method of claim 30, wherein injecting the first thermoplastic and the second thermoplastic is performed one or more of sequentially or simultaneously, in whole or in part, whereby the first carrier layer formed from the second thermoplastic is encapsulated by the outer skin layer and the inner skin layer that are formed from the first thermoplastic.

35. The method of claim 30, wherein the first thermoplastic is one of polyethylene terephthalate, high-density polyethylene, or polypropylene.

36. The method of claim 30, wherein the second thermoplastic is one of a water-soluble polymer or a hydro-degradable polymer.

37. The method of claim 36, wherein the water-soluble polymer is selected from the group consisting of: ethylene vinyl alcohol, poly vinyl alcohol, poly ethylene glycol, dextrans, pullulan, poly vinyl pyrrolidone, poly acrylic acid, poly acrylamide, poly oxazoline, poly phosphates or cellulose.

38. The method of claim 36, wherein the hydro-degradable polymer is selected from the group consisting of: sugar/polysaccharide starch, polyglycolide, polycaprolactone, poly lactic acid, or polyhydroxyalkanoates.

39. The method of claim 30, further comprising an additive which provides a visual indicator responsive to one or more of stress induced strain beyond a predetermined limit and temperature change of the body.

40. The method according to claim 30, further comprising a chromic indicator that is configured to change color responsive to a change in a characteristic of the body.

41. The method of claim 39, wherein the visual indicator is configured to provide a prominent change in appearance upon a selected container dimension of the container having crept beyond a pre-determined bound with dissolution or degradation of the second thermoplastic.

42. The method of claim 30, further comprising arranging an indicator panel on the container, wherein the indicator panel is configured to provide a visual indication responsive to stress induced strain beyond a predetermined limit.

43. The method of claim 39, wherein the visual indicator is configured to provide a prominent change in appearance upon a selected container dimension of the container having crept beyond a pre-determined hound with dissolution or degradation of the second thermoplastic.

44. The method of claim 39, wherein the visual indicator is provided by one or more of an ink, film or coating.

45. A non-transitory computer readable medium, the non-transitory computer readable medium storing computer executable instructions, which computer executable instructions when executed can cause a controller of a molding machine to execute the method according to claim 30.

46. The molded article of claim 1, wherein the molded article comprises a neck with a threaded portion, wherein at least a section of the threaded portion is devoid of the carrier layer.

\*    \*    \*    \*    \*